United States Patent
Suzuki et al.

(10) Patent No.: US 10,356,408 B2
(45) Date of Patent: Jul. 16, 2019

(54) IMAGE ENCODING APPARATUS AND METHOD OF CONTROLLING THE SAME

(71) Applicant: CANON KABUSHIKI KAISHA, Tokyo (JP)

(72) Inventors: Ryota Suzuki, Tokyo (JP); Koji Togita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 15/357,634

(22) Filed: Nov. 21, 2016

(65) Prior Publication Data

US 2017/0155902 A1     Jun. 1, 2017

(30) Foreign Application Priority Data

Nov. 27, 2015  (JP) ................................. 2015-232263
Aug. 25, 2016  (JP) ................................. 2016-165071

(51) Int. Cl.
*H04N 19/124*     (2014.01)
*H04N 19/63*      (2014.01)
*H04N 19/184*     (2014.01)

(52) U.S. Cl.
CPC ........... *H04N 19/124* (2014.11); *H04N 19/63* (2014.11); *H04N 19/184* (2014.11)

(58) Field of Classification Search
CPC ..... H04N 19/124; H04N 19/63; H04N 19/184
See application file for complete search history.

(56) References Cited

U.S. PATENT DOCUMENTS

| 5,856,997 A | 1/1999 | Mochizuki et al. | .......... 375/150 |
| 6,160,846 A * | 12/2000 | Chiang | ................ H04N 19/176 375/240.05 |
| 6,301,392 B1 * | 10/2001 | Acharya | ............... H04N 19/172 348/231.1 |
| 8,363,717 B2 | 1/2013 | Togita et al. | ............ 375/240.03 |
| 9,319,682 B2 | 4/2016 | Togita | |
| 2002/0024999 A1 * | 2/2002 | Yamaguchi | .......... G11B 27/031 375/240.03 |
| 2002/0154825 A1 * | 10/2002 | Okada | .................... H04N 19/63 382/239 |

(Continued)

FOREIGN PATENT DOCUMENTS

JP       2013-175870        9/2013

OTHER PUBLICATIONS

U.S. Appl. No. 15/299,507, filed Oct. 21, 2016.
U.S. Appl. No. 15/295,249, filed Oct. 17, 2016.

*Primary Examiner* — Shawn S An
(74) *Attorney, Agent, or Firm* — Venable LLP

(57) ABSTRACT

An apparatus comprises a dividing unit which divides image data to be encoded into a plurality of tiles, a converting unit which generates a plurality of sub-bands by a frequency transform on the divided tiles, a quantizing unit which quantizes the generated sub-bands by either (1) a first method of quantizing by identical quantization parameters in relation to identical sub-bands of a plurality of tiles, or (2) a second method of quantizing by quantization parameters set individually for each tile in relation to identical sub-bands of a plurality of tiles, an encoding unit which encodes data obtained by the quantizing, and a control unit which switches, in accordance with a target data amount of the image data to be encoded, whether to quantize by the first method or to quantize by the second method.

10 Claims, 11 Drawing Sheets

(56) References Cited

U.S. PATENT DOCUMENTS

| | | | |
|---|---|---|---|
| 2002/0167602 A1* | 11/2002 | Nguyen | G06T 3/4007 348/280 |
| 2006/0159357 A1* | 7/2006 | Mizuno | H04N 19/647 382/239 |
| 2007/0258519 A1* | 11/2007 | Srinivasan | H04N 19/176 375/240.03 |
| 2011/0307928 A1* | 12/2011 | Saunders | H04N 19/13 725/62 |
| 2013/0177074 A1 | 7/2013 | Togita et al. | 375/240.03 |
| 2013/0202266 A1* | 8/2013 | Tanaka | H04N 19/197 386/224 |
| 2015/0237375 A1* | 8/2015 | Okamoto | H04N 19/176 375/240.2 |
| 2015/0350649 A1* | 12/2015 | Okada | B60W 50/14 375/240.03 |
| 2015/0358631 A1* | 12/2015 | Zhang | H04N 19/44 375/240.16 |

* cited by examiner

FIRST QUANTIZATION METHOD

SECOND QUANTIZATION METHOD

FIG. 4A  SUB-BAND DIVIDING RESULT

| SB0<br>(2LL) | SB1<br>(2HL) | SB4<br>(1HL) |
|---|---|---|
| SB2<br>(2LH) | SB3<br>(2HH) | |
| SB5<br>(1LH) | | SB6<br>(1HH) |

FIG. 4B

| QUANTIZATION METHOD APPLICATION PATTERN | | SB0(2LL) | SB1(2HL) | SB2(2LH) | SB3(2HH) | SB4(1HL) | SB5(1LH) | SB6(1HH) |
|---|---|---|---|---|---|---|---|---|
| | APPLICATION CONDITION | | | | | | | |
| PATTERN 1 | R<T0 | A | A | A | A | A | A | A |
| PATTERN 2 | T0≤R<T1 | A | A | A | A | A | A | B |
| PATTERN 3 | T1≤R<T2 | A | A | A | A | B | B | B |
| PATTERN 4 | T2≤R<T3 | A | B | B | B | B | B | B |
| PATTERN 5 | T3≤R | A | A | A | A | A | A | A |

·R :BIT RATE
·A :FIRST QUANTIZATION METHOD
·B :SECOND QUANTIZATION METHOD
·T0~T3 :THRESHOLD(T0<T1<T2<T3)

QUANTIZATION PARAMETER SETTING RANGE

|   | APPLICATION CONDITION | QUANTIZATION PARAMETER DIFFERENCE ALLOWABLE RANGE |
|---|---|---|
| PATTERN 1 | R < T0 | ±$P_A$ |
| PATTERN 2 | T0 ≤ R < T1 | ±$P_B$ |
| PATTERN 3 | T1 ≤ R | ±$P_C$ |

- R : BIT RATE
- $P_A$~$P_C$ : AMOUNT OF DIFFERENCE OF QUANTIZATION PARAMETER OF LEADING LINE ($P_A$<$P_B$<$P_C$)
- T0~T1 : THRESHOLD (T0<T1)

TRANSITION OF QUANTIZATION PARAMETER BY LINE

QUANTIZATION PARAMETER SETTING RANGE

|  | APPLICATION CONDITION | ALLOWABLE AMOUNT OF QUANTIZATION PARAMETER |
|---|---|---|
| PATTERN 1 | R < T0 | $\pm T_A$ |
| PATTERN 2 | T0 ≤ R < T1 | $\pm T_B$ |
| PATTERN 3 | T1 ≤ R | $\pm T_C$ |

- R : BIT RATE
- $T_A \sim T_C$ : AMOUNT OF DIFFERENCE OF QUANTIZATION PARAMETER OF LINE ($T_A < T_B < T_C$)
- T0~T1 : THRESHOLD (T0<T1)

TRANSITION OF QUANTIZATION PARAMETER SETTING RANGE BY LINE

IMAGE ENCODING APPARATUS AND METHOD OF CONTROLLING THE SAME

BACKGROUND OF THE INVENTION

Field of the Invention

The present invention is something that relates to a technique for encoding of an image.

Description of the Related Art

Currently, methods of encoding have been proposed for encoding image data at high efficiency. JPEG (Joint Photographic Coding Experts Group) is a representative encoding scheme among these. In the JPEG scheme, a DCT (Discrete Cosine Transform) is used in a frequency transformation. However, it is known that block distortion occurs easily for low bit rates because the DCT in JPEG is processed in fixed block units of 8×8 pixels.

Meanwhile, in an encoding scheme called JPEG 2000 which was standardized as a successor of JPEG, a DWT (Discrete Wavelet Transform) is used in a frequency transformation. A DWT divides image data into a plurality of frequency band components by filters called a filter bank that combines a high-pass filter and a low-pass filter. Whereas a DCT performs a frequency transformation in fixed block units, a DWT is not substantially limited to that size, and can perform a frequency transformation in units of a screen, for example, and so a block distortion accompanying a quantization does not occur. After dividing image data into a plurality of frequency bands (hereinafter, referred to as sub-bands), encoding is performed after quantizing for each sub-band. In quantization, a method that reduces the code amount without impairing subjective image quality by assigning a greater code amount for low frequency sub-bands considering a characteristic of visual perception of humans is the general thinking for quantization in still images and video.

Here, a DWT and a quantization in JPEG 2000 can be applied to any rectangular block (referred to hereinafter as a tile). By a technique of dividing into such tiles and then encoding, it is possible to increase a concurrency level of processing, and reduce the capacity of the RAM (a line buffer) held internally. For example, a case of dividing image data into two—left and right—is examined. In such a case, the number of pixels of one horizontal line of the respective left and right tiles is half that of the original, and so it is possible to reduce the capacity of the line buffer held when encoding to half of the original case. However, because independent quantization is executed for each tile, there is the problem that a difference occurs in quantization errors of the respective tiles, and a distortion occurs at a tile boundary portion particularly at a time of high compression.

As prior art, in Japanese Patent Laid-Open No. 2013-175870, a method for reducing a distortion in an image quality that occurs due to discarding of a lower order bit for code amount control in an image encoding scheme in which DWT-based tile division is performed (hereinafter referred to as D1) is disclosed.

A distortion of a tile boundary does not occur if it is possible for each tile to use a shared quantization parameter. However, cases may arise in which when each tile is made to apply the same quantization parameter, controllability of the code amount conversely worsens, and a convergence to a target bit rate does not occur.

In the foregoing D1, a method for reducing boundary distortion that occurs due to lower order bit discard positions differing between tiles in code amount control using bit plane quantization according to an embedded encoding (EBCOT) is recited. In detail, a mechanism is such that error data to be discarded is encoded separately to tile data and held, and by decoding tile data using the held error data at a time of decoding, boundary distortion is reduced. However, in this method, since an error data encoding processing unit, an error data decoding processing unit, and a tile data and error data combining unit for a time of decoding are additionally necessary, there is the concern that complexity and implementation scale will increase.

SUMMARY OF THE INVENTION

The present invention was conceived in view of the above described issues, and provides a technique that aims to achieve both a reduction in tile boundary distortion and high code amount controllability by a simple control method while suppressing increases in implementation scale when performing quantization and encoding of tile divided image data.

According to an aspect of the present invention, there is provided an image encoding apparatus that divides image data to be encoded into a plurality of tiles, and encodes these tiles as units, the apparatus comprising: a tile dividing unit configured to divide image data to be encoded into a plurality of tiles; a frequency converting unit configured to generate a plurality of sub-bands by a frequency transform on the tiles divided by the tile dividing unit; a quantizing unit configured to quantize the sub-bands generated by the frequency converting unit by either: (1) a first quantization method of quantizing by identical quantization parameters in relation to identical sub-bands of a plurality of tiles, or (2) a second quantization method of quantizing by quantization parameters set individually for each tile in relation to identical sub-bands of a plurality of tiles; an encoding unit configured to encode data obtained by quantizing by the quantizing unit; and a control unit configured to switch, in accordance with a target data amount of the image data to be encoded, whether to quantize by the first quantization method or to quantize by the second quantization method.

By virtue of the present invention, it becomes possible to achieve both a reduction in tile boundary distortion and high code amount controllability by simple control while suppressing increases in implementation scale when performing quantization and encoding of tile divided image data.

Further features of the present invention will become apparent from the following description of exemplary embodiments (with reference to the attached drawings).

BRIEF DESCRIPTION OF THE DRAWINGS

FIGS. 4A and 4B are views illustrating an example of sub-band division, and a relation between the bit rate and the quantization method applied to each sub-band in the first embodiment.

DESCRIPTION OF THE EMBODIMENTS

Hereinafter, embodiments according to the present invention will be explained in detail in accordance with the accompanying drawings. Note that in the following description, an image capturing apparatus represented in a digital camera will be described in an example as an apparatus to which the image encoding apparatus is applied. Accordingly, a source of generation of image data to be encoded is an image capturing unit that the image capturing apparatus has. However, the present invention is not something that can only be applied to an image capturing apparatus. Also, the source of generation of image data to be encoded is not limited to an image capturing unit, and may be a storage medium storing the image data to be encoded, regardless of the type thereof. It should be understood that it is only for simplification of understanding.

[First Embodiment]

Figure 1:
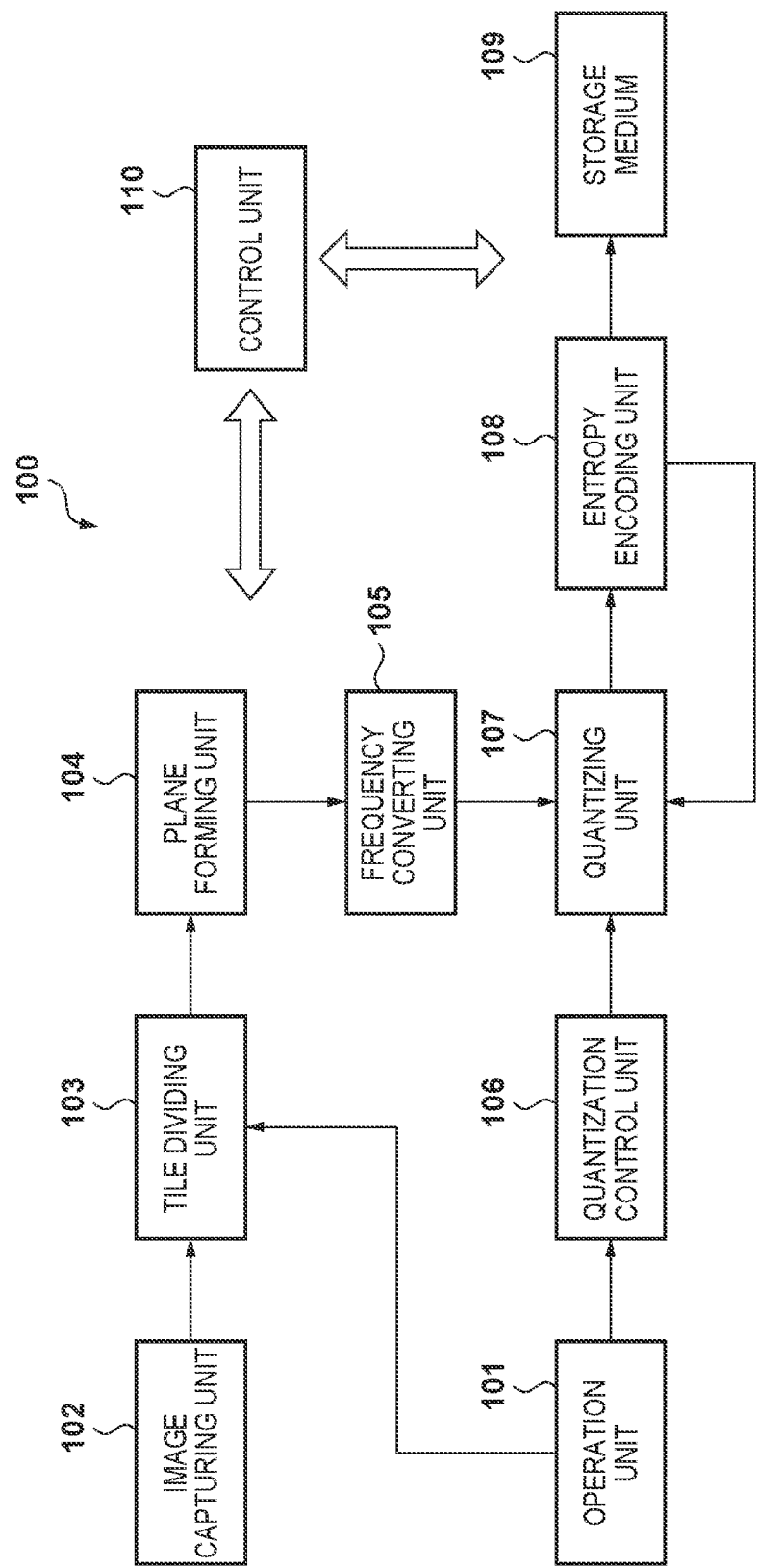
FIG. 1 is a block configuration diagram of an image capturing apparatus in a first embodiment.

FIG. 1 is a block configuration diagram of an image capturing device 100 to which the first embodiment is applied. The image capturing device 100 is of a configuration in which it records captured image information after dividing it into a plurality of tiles. Also, the size of the tiles is changeable, and for example, the entire image data may be set as one tile. Also, the division into tiles may divide the image data in a horizontal direction, or may divide it in a vertical direction, where the division in the horizontal direction is a division of the image data such that a plurality of tiles are arranged in the horizontal direction, and boundary lines of the divisions are in the vertical direction, and a division in the vertical direction is division of image data such that a plurality of tiles are arranged in the vertical direction, and boundary lines of the divisions are in the horizontal direction. Also, configuration may be taken so as to divide the image data in the horizontal and vertical directions. A control unit 110 is something that controls each component of reference numerals 101 through 109, and that is responsible for control of the entire apparatus. Typically, the control unit 110 is something that is configured by a CPU, a ROM that stores data and a program describing a processing procedure of the CPU, and a RAM used as a work area or the like of the CPU. Note that some or all of the reference numerals 101 through 109, may be realized by processing of the control unit 110.

An operation unit 101 accepts instructions of a user, and generates control signals in accordance with the instructions. For example, capturing instructions, and settings such as for a tile division number (the size of a tile), a recording bit rate, and a compression rate are inputted from the operation unit 101. The inputted tile division number is supplied to a tile dividing unit 103. Also, the recording bit rate is supplied to a quantization control unit 106, and is used as a target data amount.

An image capturing unit 102, converts into image information a signal of light intensity that passes through red, green, and blue (RGB) color filters arranged for each pixel of an image sensor based on control signals from the operation unit 101, and outputs the converted image information to the tile dividing unit 103. The first embodiment refers to image data outputted from the image capturing unit 102 as RAW image data which has the meaning of being an image that is raw (not developed). A Bayer arrangement is an example of a color filter arranged for the image capturing unit 102. In a Bayer arrangement, red (R), green (G), and blue (B) are arranged in a mosaic form for each pixel, and the structure is such that for four pixels (2×2), one red (R) pixel, one blue (B) pixel, and two green (G1 and G2) pixels are arranged regularly in a set.

The tile dividing unit 103 stores the RAW image data inputted from the image capturing unit 102 first in an internal memory, and then based on the tile division number supplied from the operation unit 101, divides the RAW image data into one or more tiles. Note that the tile division number from the operation unit 101 is of a form of M×N, and the divided tiles are basically made to be the same size. However, the horizontal number of pixels of the original RAW image data is not limited to be an integer multiple of M, and it is assumed that surplus pixels are allocated to an appropriate tile in accordance with a condition set in advance. A corresponding point is similar for the division number N of the vertical direction. The tile dividing unit 103 sequentially supplies each tile obtained by dividing to a plane forming unit 104. Note that configuration may be taken so as to calculate automatically the division number such that the internal memory resources do not fail in accordance with the image size input from the image capturing unit 102 without using the tile division number inputted from the operation unit 101.

The plane forming unit 104 forms a color plane by breaking the RAW image data of the tiles supplied from the tile dividing unit 103 into each of the color components. Because it is a Bayer array RAW image, the color plane forming unit 104 extracts each of the red (R), green (G1), green (G2), and blue (B) color components, and forms a color plane. Then, the plane forming unit 104 supplies the formed R plane, G1 plane, G2 plane, and B plane to a frequency converting unit 105 in order, for example.

The frequency converting unit 105 executes a discrete wavelet transform on the R plane received from the plane forming unit 104, and supplies transformation coefficient data obtained as a result to a quantizing unit 107. In this discrete wavelet transform, for example, an integer type 5×3 type filter defined in JPEG 2000, or a real number type 9×7 filter may be used. Then, the frequency converting unit 105 executes a discrete wavelet transform on other planes (G1, G2, and B planes) received from the plane forming unit 104, and supplies the transformation coefficient data obtained in the results to the quantizing unit 107.

The quantization control unit 106, based on a recording bit rate or a compression rate inputted from the operation unit 101, determines a quantization parameter for the quantizing unit 107 to use, and supplies it to the quantizing unit 107. Here, the quantization control unit 106 in the embodiment is of a configuration in which the quantization parameter is determined based on either one of two quantization methods. The details of these two quantization methods are described later.

The quantizing unit 107 executes quantization using the quantization parameter received from the quantization control unit 106 on the transformation coefficient data received from the frequency converting unit 105, and supplies the quantized transformation coefficient data to an entropy encoding unit 108.

The entropy encoding unit 108 generates encoded data by encoding quantized transformation coefficient data received from the quantizing unit 107. Then, the entropy encoding unit 108 supplies the generated encoded data to a storage medium 109. This encoding is executed using entropy encoding such as Golomb coding, for example.

The storage medium 109 is a non-volatile memory for storing encoded data received from the entropy encoding unit 108 (for example, an attachable/removable storage medium (an SD card) or the like).

Figure 2A:
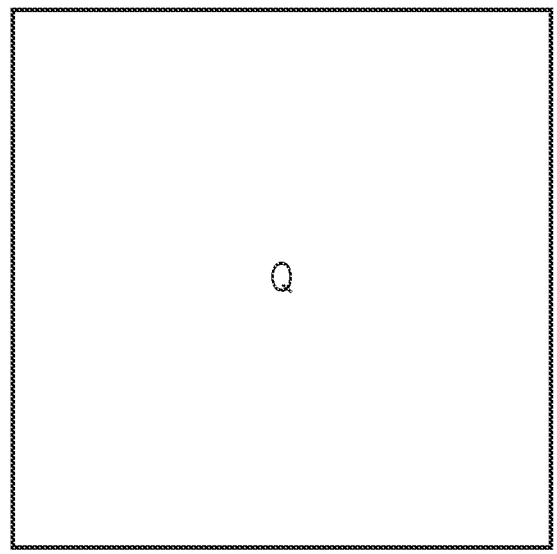
FIGS. 2A and 2B are views for describing two quantization methods in the embodiments.
Figure 2B:
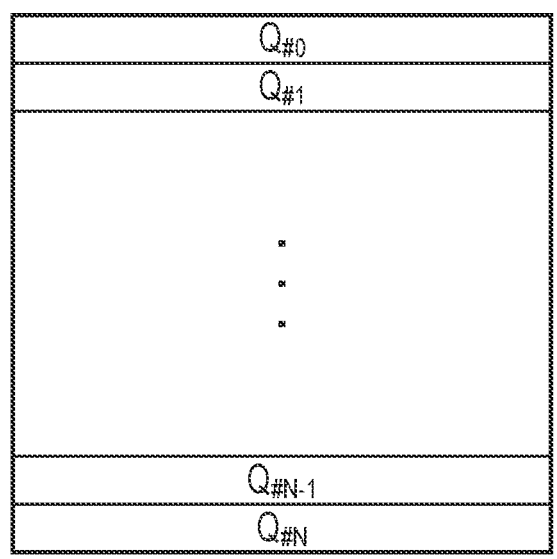

Next, explanation is given using FIGS. 2A and 2B for a first quantization method and a second quantization method in the quantization control unit 106.

FIG. 2A is a conceptual diagram illustrating the first quantization method, and FIG. 2B is a conceptual diagram illustrating the second quantization method. Hereinafter, further detailed description is given of these. Note that the frequency converting unit 105 in the embodiment is described as something in which a discrete wavelet transform is performed two times on one tile. As a result, seven sub-bands SB0 through SB6 are generated from one tile as illustrated in FIG. 4A. Note that the number of times that the discrete wavelet transform is executed is not limited to two times, and the number of times is not limited if it is one or more times. Depending on the case, configuration may also be taken such that it is possible to set the number of times from the operation unit 101.

<First Quantization Method>

As illustrated in FIG. 2A, there is a method of quantizing one sub-band uniformly in a plane. For a quantization parameter in this quantization method, a relationship of one parameter for one sub-band is fixed, and the same sub-band quantization parameter (quantization step) in each tile takes the same value between neighboring tiles. Since, for sub-bands of each tile, the same quantization parameter is set between tiles, no distortion of tile boundaries due to quantization occurs. Note that description is given of a method in which statistic values are prepared in advance, and are applied in the quantization, such that the quantization parameter in the present embodiment converges near a target data amount corresponding to a compression rate or a bit rate inputted from the operation unit 101.

Note that in the embodiment, seven sub-bands are generated from one tile from the frequency converting unit 105. Consequently, a quantization parameter set in advance is set for each sub-band.

<Second Quantization Method>

As illustrated in FIG. 2B, there is a method of quantization in which one sub-band is divided into units of lines, and each line uses a different quantization parameter (Q#x) (x=0, 1, 2 . . . ). With this quantization method, since it is possible that the quantization parameter changes for each line, convergence to the target data amount corresponding to the set bit rate or compression rate is high. Also, in the present embodiment, it is assumed to be something that divides for each single line, but it may divide into units of a predetermined number of lines.

The basic thinking for processing for determining the first quantization method and the second quantization method will now be described. Because in a case where the bit rate is low (a case where the target compression rate is high), a quantization parameter is set to be large in order to suppress the code amount, the quantization error becomes larger. That is, there will be a tendency for distortion at a tile boundary portion to be easy to perceive visually. In accordance with this point, the first quantization method which prioritizes the image quality of a tile boundary is determined.

Meanwhile, because a quantization parameter is set to be smaller if the bit rate is larger (if the target compression rate is low), the quantization error is smaller. Because distortion of a tile boundary portion will be difficult to perceive visually, the second quantization method which prioritizes convergence of the bit rate is determined.

Figure 3:
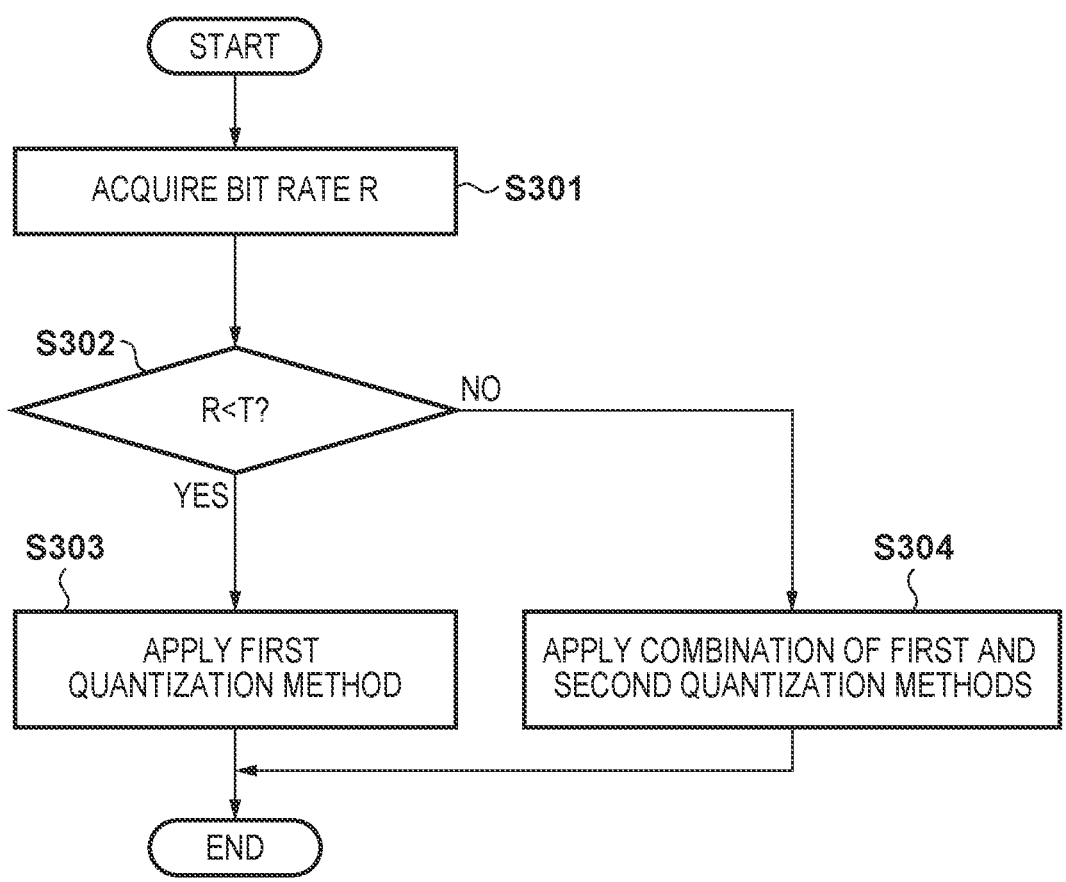
FIG. 3 is the flowchart illustrating quantization method determination processing in the first embodiment.

Next, a description of quantization method determination processing that the quantization control unit 106 performs in relation to RAW image encoding processing is given based on the flowchart illustrated in FIG. 3.

In step S301, the quantization control unit 106 acquires a bit rate R that the user set from the operation unit 101. Note that in a case where the bit rate is held in a memory (not shown) as long as the user does not change it, the bit rate may be acquired from that memory. In step S302, the quantization control unit 106 performs a larger/smaller determination by comparing the acquired bit rate R and a threshold T set in advance. If the bit rate R falls below a threshold T0 (if R<T0), the processing proceeds to step S303. Also, if the bit rate R is greater than or equal to the threshold T0, the processing proceeds to step S304. Note that an example of a setting of the threshold T0 is described later.

In step S303, the quantization control unit 106 determines that for a quantization method of each sub-band of a tile of interest, the first quantization method will be used. Also, if the processing proceeds to step S304, the quantization control unit 106 determines that a combination of the first quantization method and the second quantization method will be used as the quantization method for each sub-band of the tile of interest.

Here, using FIG. 4A and 4B an example of setting a threshold T, and the quantization method that combines the first quantization method and the second quantization method will be described.

FIG. 4A indicates sub-bands generated in a case where on one tile, the discrete wavelet transform is executed two times. Each sub-band has the following meaning.

sub-band SB0 (also represented as 2LL):

A set of transformation coefficient data obtained by applying vertical direction low-pass filter processing and horizontal direction low-pass filter processing on a set (1LL) of transformation coefficient data of a low-frequency component obtained by a first discrete wavelet transform.

sub-band SB1 (also represented as 2HL):

A set of transformation coefficient data obtained by applying vertical direction low-pass filter processing and horizontal direction high-pass filter processing on a set (1LL) of transformation coefficient data of a low-frequency component obtained by a first discrete wavelet transform.

sub-band SB2 (also represented as 2LH):

A set of transformation coefficient data obtained by applying vertical direction high-pass filter processing and horizontal direction low-pass filter processing on a set (1LL) of transformation coefficient data of a low-frequency component obtained by a first discrete wavelet transform.

sub-band SB3 (also represented as 2HH):

A set of transformation coefficient data obtained by applying vertical direction high-pass filter processing and horizontal direction high-pass filter processing on a set (1LL) of transformation coefficient data of a low-frequency component obtained by a first discrete wavelet transform.

sub-band SB4 (also represented as 1HL):

A set of transformation coefficient data obtained by applying vertical direction low-pass filter processing and horizontal direction high-pass filter processing on a tile.

sub-band SB5 (also represented as 1LH):

A set of transformation coefficient data obtained by applying vertical direction high-pass filter processing and horizontal direction low-pass filter processing on a tile.

sub-band SB6 (also represented as 1HH):

A set of transformation coefficient data obtained by applying vertical direction high-pass filter processing and horizontal direction high-pass filter processing on a tile.

Here, a concrete example of the processing of step S303 and step S304 of the quantization control unit 106 is described. FIG. 4B is a table indicating quantizing method application patterns of each sub-band. A threshold size relationship is T0<T1<T2<T3.

Pattern 1:

A pattern in which the first quantization method is applied to all sub-bands obtained from the tile of interest in the case where the bit rate R is less than the threshold T0. The processing of the case corresponding to this pattern 1 is the processing of step S303. With pattern 2 through pattern 5 described below, the processing in step S304 is applied.

Pattern 2:

A pattern in which if the bit rate R is greater than or equal to the threshold T0 and less than T1, the second quantization method is applied to the sub-band SB6, and for other sub-bands SB0 through 5, the first quantization method is applied.

Pattern 3:

A pattern in which if the bit rate R is greater than or equal to the threshold T1 and less than T2, the second quantization method is applied to the sub-band SB4 through SB6, and for other sub-bands SB0 through 3, the first quantization method is applied.

Pattern 4:

A pattern in which if the bit rate R is greater than or equal to the threshold T2 and less than T3, the second quantization method is applied to the sub-band SB3 through SB6, and for other sub-bands SB0 through 2, the first quantization method is applied.

Pattern 5:

A pattern in which if the bit rate R is greater than or equal to the threshold T3, the second quantization method is applied to the sub-bands SB1 through SB6, and for sub-band SB0, the first quantization method is applied.

With the pattern 5 for which the bit rate is the highest, since distortion of a tile boundary portion is difficult to perceive visually, the sub-bands to which the second quantization method is applied are most numerous, and the control is such that convergence of the bit rate is emphasized.

The sub-bands in the embodiment are represented by SB# (#=0, 1, 2, . . . ). Even if the number of times that a wavelet transformation is performed is other than two, if the corresponding representation is used, it can be said to be described in order from the low frequency component. Processing of the quantization control unit 106 in the foregoing patterns 1 through 5 can be summarized as in (1) and (2) below.

(1) If a plurality of sub-bands obtained by the frequency transformation are arranged in order from the low frequency, the first quantization method is applied to the M sub-bands from the lowest frequency toward a higher frequency, and the second quantization method is applied to the N sub-band from the M+1th to the highest frequency.

(2) The lower the bit rate, the larger M is made to be (also, the higher the bit rate, the larger N is made to be).

However, for the lowest frequency sub-band SB0 (2LL in the embodiment), the first quantization method is applied irrespective of the bit rate.

As described above, in the encoding of an image divided into tiles, by dynamically switching the quantization method in accordance with the bit rate, it is possible to provide an image encoding apparatus capable of achieving both tile boundary distortion suppression and code amount controllability.

Note that because for encoding processing based on the first quantization method, quantization is performed based on the same quantization parameter for all transformation coefficients of the sub-band of interest, and then encoding is performed, description thereof is unnecessary. Accordingly, below, description is given of how changes of a quantization parameter for each line transition based on the second quantization method together with the encoding processing therefor.

When encoding is performed on lines 0, 1, 2, . . . of a sub-band of interest, encoded data of each line is generated. That is, as long as the encoding of each line continues, a total code amount monotonically increases.

A target code amount for when the encoding of all lines of the sub-band of interest ends is determined by the number of divided tiles, the number of times of wavelet transformation, as well as the type of the sub-band of interest, in addition to the bit rate R that the user set.

Figure 6:
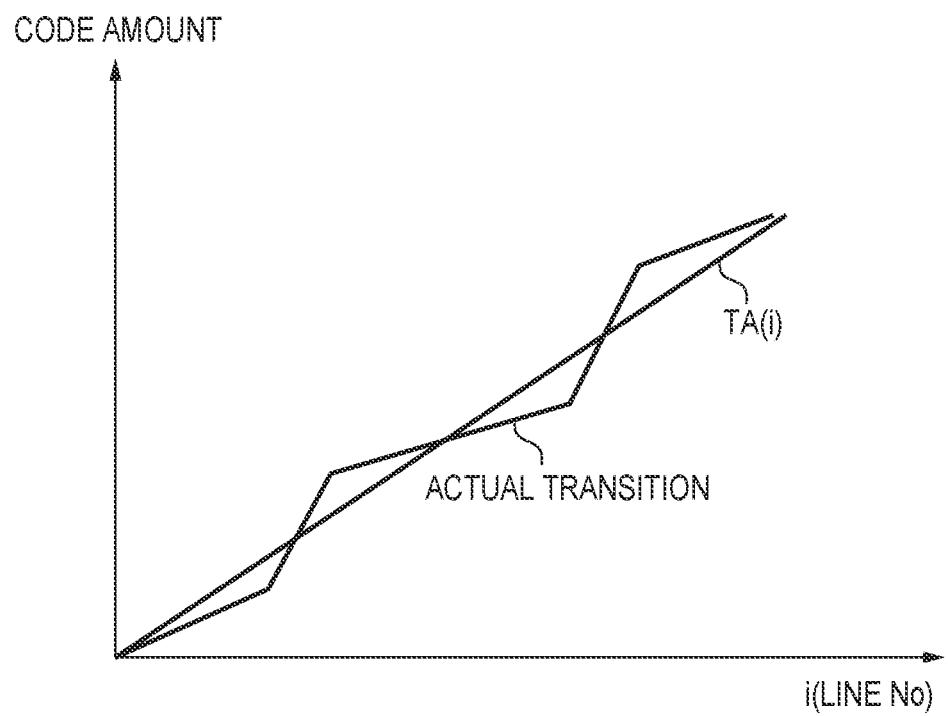
FIG. 6 is a view illustrating transition of a code amount at a time of sub-band encoding.

FIG. 6 illustrates a transition of a code amount for when quantization and encoding of the sub-band of interest are performed in order from line 0. An upward-sloping straight line shown graphically illustrates a straight line (hereinafter referred to as an ideal straight line) that indicates the ideal transition connecting the target code amount and the origin point. The accumulated target code amount from the 0th line to the i-th line is represented as "TA(i)". Actually, quantization and encoding is not limited to transitioning on this ideal straight line, and the accumulated code amount increases while exceeding and falling below the ideal straight line. If the ideal straight line is exceeded, it means that it is necessary to suppress generation of the code amount. Consequently, at the time of quantization of the next line, the quantization parameter (the quantization step) is caused to increase by a predetermined value. Meanwhile, it means that if it falls below the ideal straight line, the code amount may be increased, and the image quality improved. Consequently, at the time of quantization of the next line, the quantization parameter (the quantization step) is caused to decrease by a predetermined value.

Figure 7:
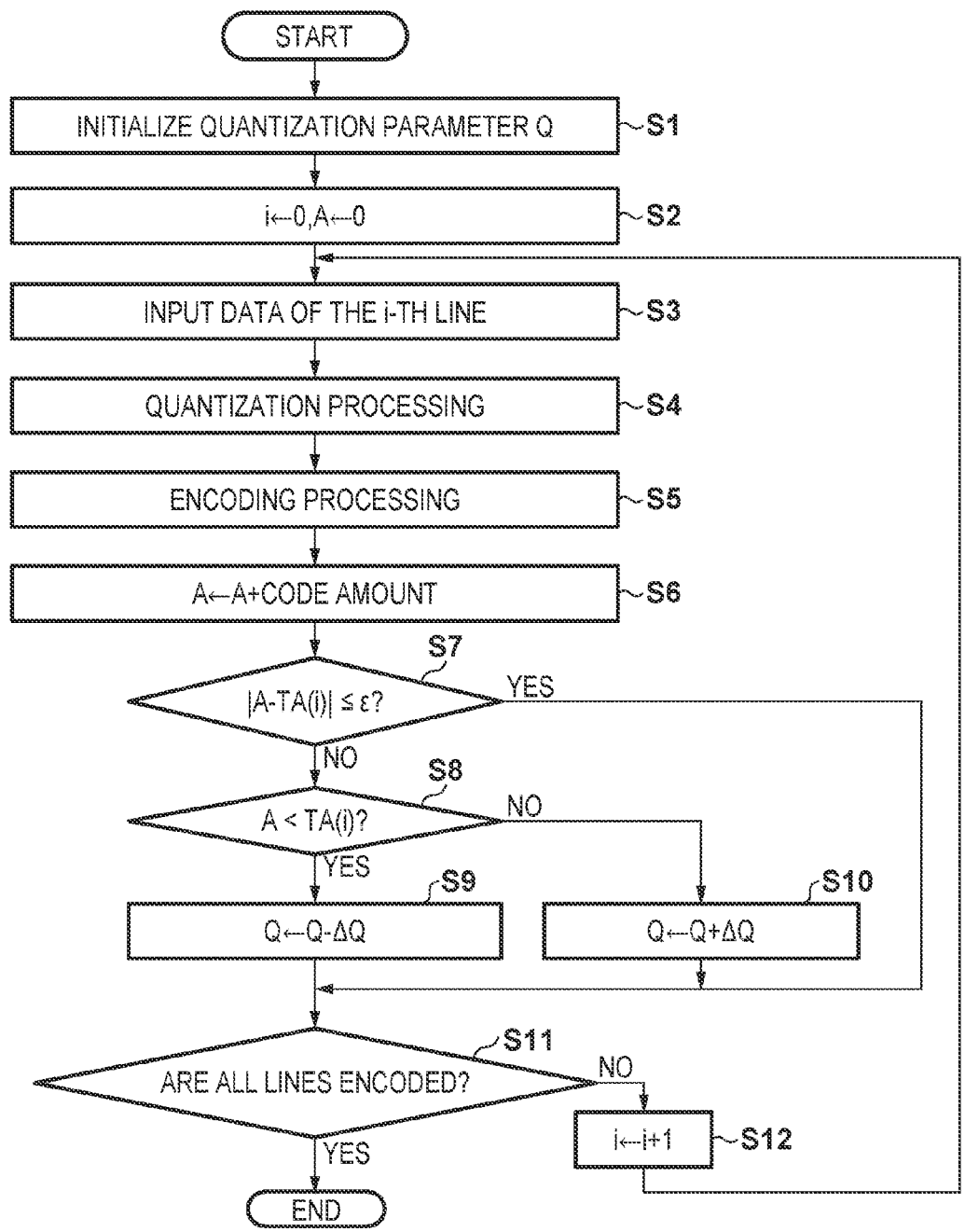
FIG. 7 is a flowchart illustrating an encoding processing procedure of the first embodiment.

Based on this point, description is given in accordance with a flowchart of FIG. 7 of encoding processing of a particular sub-band under the control of the control unit 110 in the embodiment. Note that a variable i used in the following description is used to specify a line number. Also, a variable A is something that is used for storing the accumulated code amount from the 0th through the i-th line.

Firstly, the control unit 110, in step S1, controls the quantization control unit 106 to set an initial value of a quantization parameter Q prior to encoding of a sub-band of interest. This initial value is determined by the bit rate R that the user sets, the number of divided tiles, the number of times of wavelet transformation, and the type of the sub-band of interest.

Next, in step S2, the control unit 110 clears each of the variable i and A to 0. Then, in step S3, the control unit 110 controls the quantizing unit 107 to cause input from the frequency converting unit 105 of the transformation coefficient data of the i-th line from the sub-band of interest, and in step S4 causes quantization to be performed using the quantization parameter Q. Then, in step S5, the control unit 110 controls the entropy encoding unit 108 to cause entropy encoding to be executed on the transformation coefficient data of the first line portion after quantization. Then, the control unit 110, in step S6, updates the variable A by adding the encoding data amount of the i-th line to the variable A.

Subsequently, the control unit 110 determines, in step S7, whether or not the absolute value of the difference between the accumulated code amount A up until the i-th line and an accumulated target code amount TA(i) is less than or equal to a threshold ε set in advance. If it is less than or equal to the threshold ε, the processing proceeds to step S11, the control unit 110 determines whether or not encoding of all lines has ended, and if not, the variable i is caused to increase by "1" in step S12, and the processing from step S3 is repeated.

Also, if the difference between the accumulated code amount A up until the i-th line and the accumulated target code amount TA(i) exceeds the threshold ε, the control unit 110 advances the processing to step S8, and determines whether or not A <TA(i), that is, whether or not the accumulated code amount A falls below the accumulated target code amount TA(i). If A<TA(i), the code amount may be increased. Consequently, the control unit 110, in step S9, causes the quantization parameter Q to decrease by a positive predetermined value ΔQ set in advance. Also, if A>TA(i), it is necessary to reduce the code amount. Consequently, the control unit 110, in step S10, causes the quantization parameter Q to increase by the predetermined value ΔQ.

The result of the above is that it is possible to realize encoding in which the quantization parameter of the sub-band of interest is changed in units of lines.

[Second Embodiment]

The apparatus configuration according to the second embodiment is similar to in the foregoing first embodiment, and so description of the configuration is omitted. Also, the quantization method determination processing that the quantization control unit 106 performs is omitted because it is similar to the first embodiment. The point of difference is that in the second quantization method (FIG. 2B) in the second embodiment, configuration is taken so that the quantization parameter for each line is determined so that the quantization parameter between identical sub-bands in neighboring tiles fits into a predetermined range. Also, in the present embodiment, if tile division is performed, the image data is at least divided in the horizontal direction. For this reason, data of the same line of the image data is divided into a plurality of tiles.

Regarding the second quantization method in the first embodiment, the processing content is always the same without depending on the bit rate, and the difference in the quantization parameter between tiles was not considered. For this reason, in particular, at a time of a low bit rate, if the amount of difference of the quantization parameters between neighboring tiles is large, there was a possibility that distortion of tile boundaries could occur.

Accordingly, in the second quantization method of the second embodiment, it is an objective that the balance between more fine image quality and bit rate convergence be made to be optimal by arranging a setting range for the quantization parameters of each line between neighboring tiles in accordance with the bit rate. Corresponding details are described below.

Description is given of the quantization parameter setting method in the second quantization method in the second embodiment, and the setting value range. In the second embodiment, the quantization parameter of the leading line of the sub-band of the tile of interest of divided tiles is the same value between tiles.

Figures 5A, 5B:
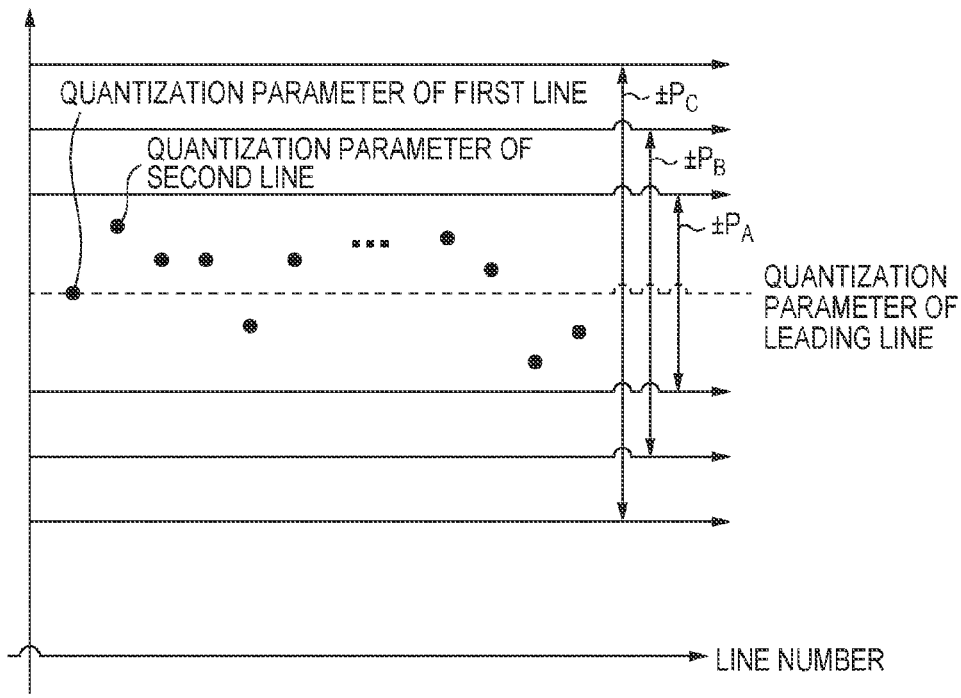
FIGS. 5A and 5B are views illustrating a relation between the bit rate and an allowable range of a quantization parameter, and quantization parameter transitioning in the second embodiment.

FIG. 5A indicates predetermined sub-band quantization parameter setting ranges of tiles. Also, FIG. 5B represents that the quantization parameter for each line transitions so as to fit into the setting ranges illustrated in FIG. 5A. Regarding the method of setting the thresholds T0 and T1 in FIG. 5A, the values may be set so that, for example, the maximum bit rates that can be recorded are made to be equally spaced. However, description is given such that the size relationship of the thresholds is T0<T1, where there are three setting patterns based on thresholds. Also, the size relationship between quantization parameter difference allowable ranges PA, PB, and PC is PA<PB<PC.

Pattern 1:

If the bit rate R is less than the threshold T0, the quantization parameter of each line used in the second quantization method is set to fit into the range of ±PA in relation to the quantization parameter of the leading line.

Pattern 2:

If the bit rate R is greater than or equal to the threshold T0 and less than T1, the quantization parameter used in the second quantization method is set to fit into the range of ±PB in relation to the quantization parameter of the leading line.

Pattern 3:

If the bit rate R is greater than or equal to the threshold T1, the quantization parameter used in the second quantization method is set to fit into the range of ±PC in relation to the quantization parameter of the leading line.

As can be seen from FIGS. 5A and 5B, in pattern 3 for which the bit rate is the highest, distortion of tile boundary portions is difficult to perceive visually, and therefore a quantization parameter is set in a broader range.

Meanwhile, in pattern 1 for which the bit rate is the lowest, since distortion of the tile boundary portion becomes easier to perceive visually when the bit rate falls, tile distortion is suppressed by setting the quantization parameter in a narrower range.

As described above, in the encoding of an image divided into tiles, by dynamically switching the setting range of the quantization parameter in accordance with the bit rate, it is possible to provide an image encoding apparatus capable of adjusting the balance between finer image quality and bit rate convergence.

Figure 8:
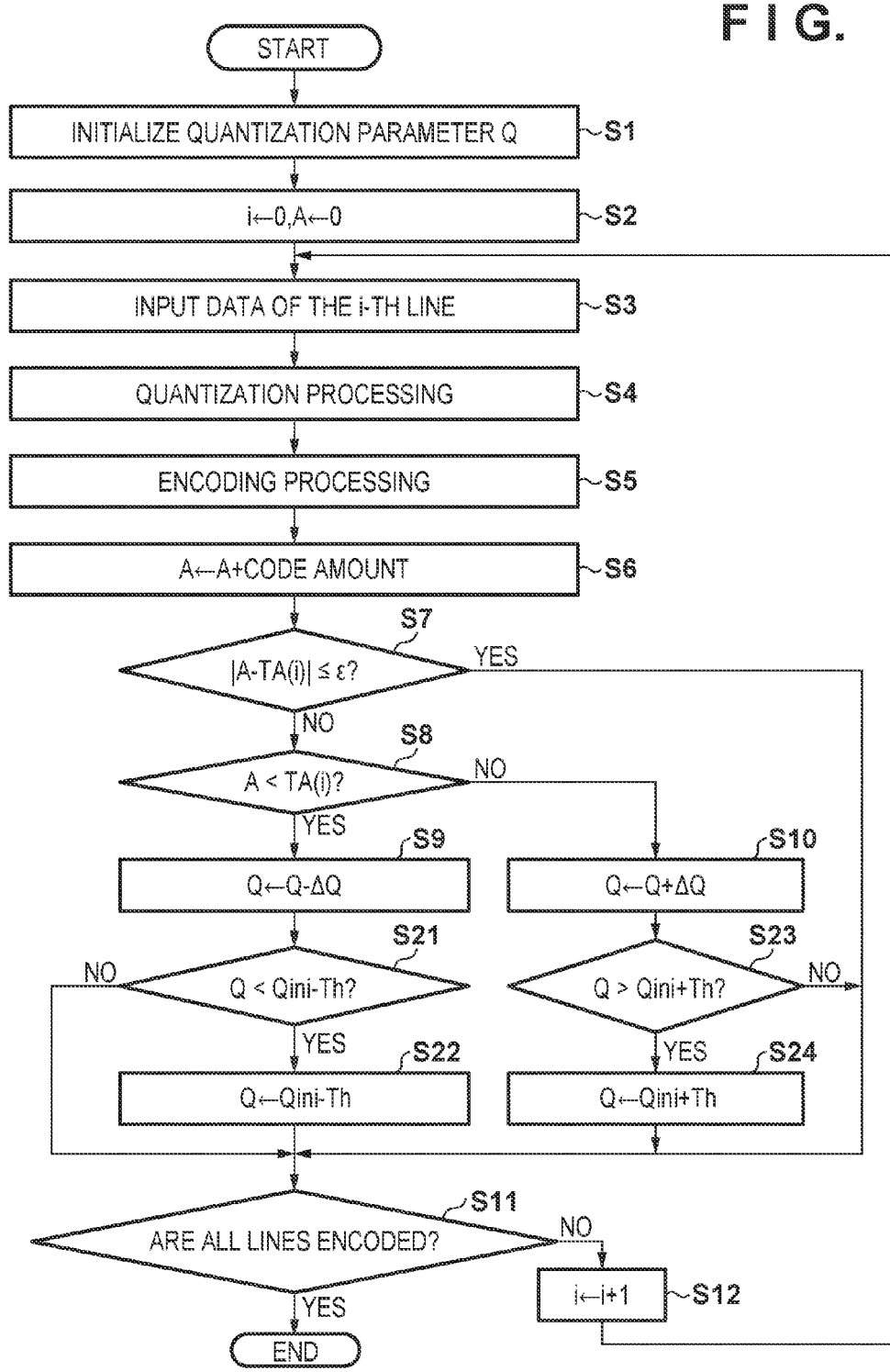
FIG. 8 is a flowchart illustrating an encoding processing procedure of the second embodiment.

FIG. 8 is a flowchart illustrating of encoding processing of a particular sub-band under the control of the control unit 110 in the second embodiment. The difference between FIG. 8 and FIG. 7 is that step S21 through step S24 were added. Also, because other than step S21 through step S24, it is the same as in FIG. 7, that description is omitted. Note that a limiter Th used in the following description is one of PA, PB, and PC as illustrated earlier.

The control unit 110 advances the processing to step S21 when the quantization parameter Q is caused to decrease by the positive predetermined value ΔQ set in advance in step S9. In step S21, the control unit 110 compares the result of subtracting the limiter Th from an initial quantization parameter (the quantization parameter of the 0th line) Qini of the sub-band of interest and the reduced quantization parameter Q.

Then, if Q<Qini−Th, the control unit 110, in step S22, sets the quantization parameter Q to Qini−Th. The result of this is that the quantization parameter Q will cease to fall below the value resulting from subtracting Th from the quantization parameter Qini of the leading line.

Meanwhile, the control unit 110 advances the processing to step S23 when the quantization parameter Q is caused to increase by the positive predetermined value AQ set in advance in step S10. In step S23, the control unit 110 compares the quantization parameter Q after the increase and the result of adding the limiter Th to the initial quantization parameter Qini of the sub-band of interest.

Then, if Q>Qini+Th, the control unit 110, in step S24, sets the quantization parameter Q to Qini+Th. The result of this is that the quantization parameter Q will cease to exceed the value resulting from adding Th from the quantization parameter Qini of the leading line.

[Third Embodiment]

Figure 9:
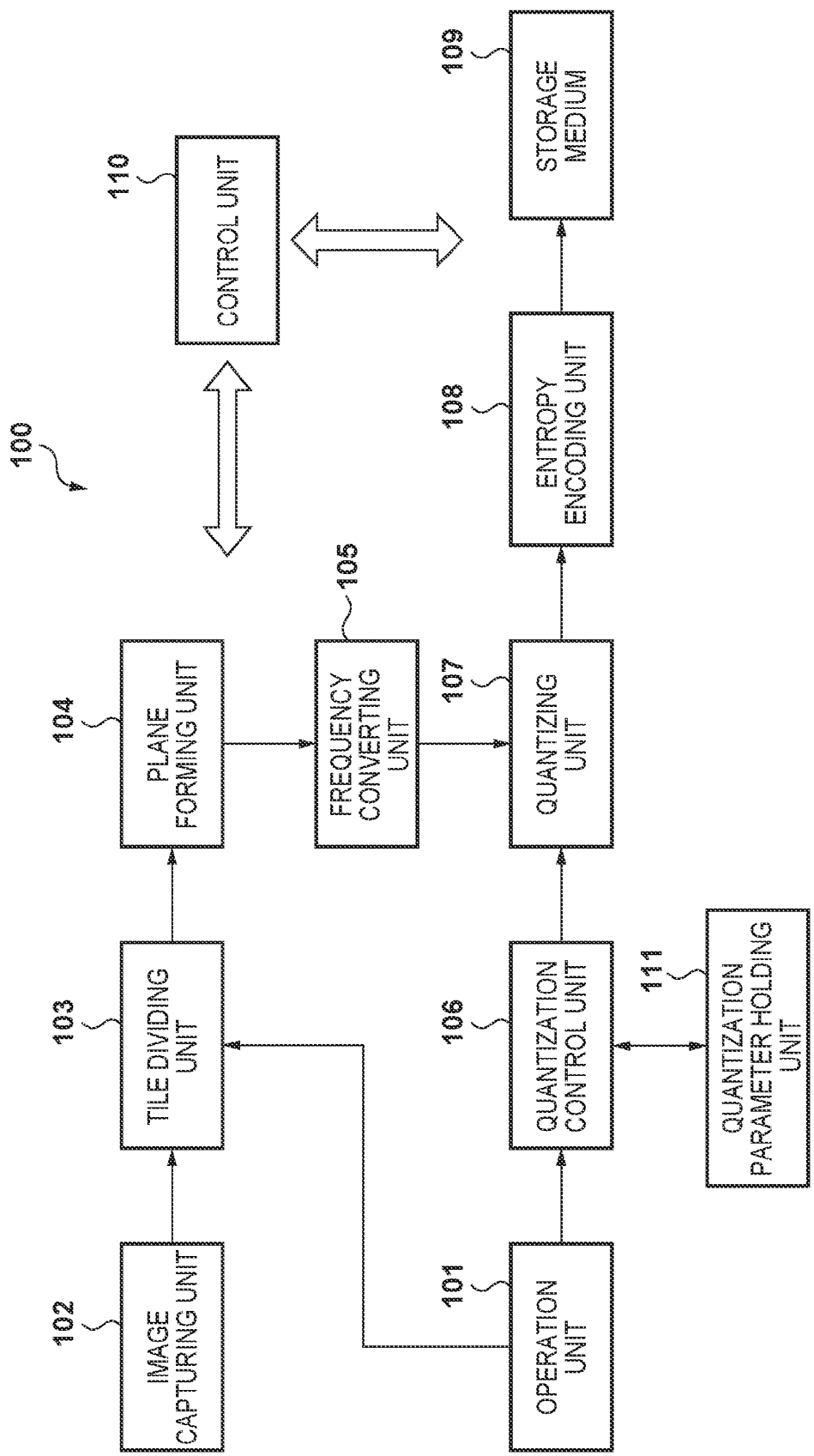
FIG. 9 is a block configuration diagram of the image capturing apparatus in the third embodiment.

FIG. 9 is a block configuration diagram of the image capturing device 100 to which the third embodiment is applied. The third embodiment is of a configuration in which a quantization parameter holding unit 111 is added in relation to the foregoing first embodiment. Other configurations are similar to in the foregoing first embodiment, and so description thereof is omitted. Also, description regarding the quantization method determination processing that the quantization control unit 106 performs is omitted because it is similar to the first embodiment. Also, in the present embodiment, if tile division is performed, the image data is at least divided in the horizontal direction. For this reason, data of the same line of the image data is divided into a plurality of tiles.

A point of difference is that in the second quantization method (FIG. 2B) in the third embodiment, configuration is such that using quantization parameters held in the quantization parameter holding unit 111, a quantization parameter for each line is determined so that the quantization parameters between identical sub-bands in neighboring tiles are within a predetermined range, the determined quantization parameter for each line is output to the quantization parameter holding unit 111, and the held quantization parameter is updated.

According to the second quantization method in the second embodiment, a quantization parameter of an i-th line in a particular sub-band is within an allowable range that is set in relation to a quantization parameter of the leading line of that sub-band. Accordingly, if the quantization parameter of the leading line is an erroneous setting, it becomes impossible to change other lines in the sub-band significantly from the erroneous setting. The result of this is that there is a possibility of image quality deterioration, and that the generated encoding data amount will deviate significantly from the desired bit rate.

The second quantization method in the third embodiment is configured so that rather than causing a quantization parameter of each line in the sub-band to converge to the leading quantization parameter, it is made to fit within a predetermined range from the quantization parameter of each line of the identical sub-band of a neighboring tile.

Note that the quantization and encoding tile order is made to be a raster scan order where a tile is made to be a unit. Also, the tile of interest is the j-th tile, and the quantization parameter of the i-th line of the sub-band of interest in that tile of interest is expressed by Q(j,i). In such a case, the quantization parameter actually used when quantizing the i-th line of a sub-band of the same type in the neighboring tile already encoded immediately previously of the tile of interest can be expressed as Q(j−1,i). The quantization parameter holding unit 111 is something that stores and holds quantization parameters of all sub-bands of the tile quantized one previously.

In the third embodiment, as long as the following conditions are satisfied, variation of the quantization parameter Q(j−1,i) of the line of interest is allowed.

$$Q(j-1,i)-Th \leq Q(j,i) \leq Q(j-1,i)+Th \quad (1)$$

In the above formula, Th is a limiter value that holds a positive value that defines an allowable range of a quantization parameter.

Note that in the plurality of tiles included in the image information, when quantizing and encoding each sub-band of a leading tile, a quantization parameter of each sub-band of a final tile of an image immediately preceding, which is held in the quantization parameter holding unit 111, is used. Then, for a first tile of a first image (frame) at which recording as a moving image is started, a quantization parameter set in advance is used.

Hereinafter, based on this point, the third embodiment will be described more specifically. In the third embodiment, similarly to the second embodiment, the quantization parameter (initial parameter) of the leading line of the sub-band of the tile of interest of divided tiles is the same value between tiles.

Figures 10A, 10B:
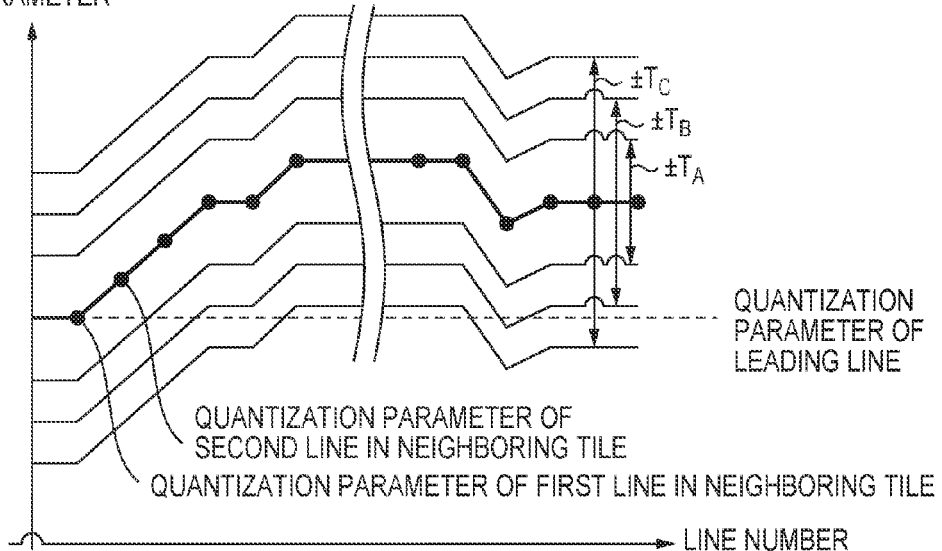
FIGS. 10A and 10B are views illustrating a relation between the bit rate and an allowable range of a quantization parameter, and quantization parameter allowable range transitioning in the third embodiment.

FIG. 10A illustrates a quantization parameter setting range corresponding to a quantization parameter of an identical line held in the quantization parameter holding unit of a predetermined sub-band of a tile corresponding to a bit rate R. Also, FIG. 10B represents transitioning of a setting range of quantization parameters for each line illustrated in FIG. 10A.

Regarding the method of setting the thresholds T0 and T1 in FIG. 10A, the values may be set so that, for example, the maximum bit rates that can be recorded are made to be equally spaced. However, description is given such that the size relationship of the thresholds is T0<T1, where there are three setting patterns based on thresholds. Also, the size relationship between quantization parameter allowable amounts TA, TB, and TC is TA<TB<TC.

Pattern 1:

If the bit rate R is less than the threshold T0, the quantization parameter of each line used in the second quantization method is set so to fit in the range ±TA with respect to the quantization parameter of the identical line of a neighboring tile held in the quantization parameter holding unit. That is, a limiter value Th described in Formula (1) is determined as TA.

Pattern 2:

If the bit rate R is greater than or equal to the threshold T0 and less than T1, the quantization parameter used in the second quantization method is set so to fit in the range ±TB with respect to the quantization parameter of the identical line of a neighboring tile held in the quantization parameter holding unit. That is, a limiter value Th described in Formula (1) is determined as TB.

Pattern 3:

If the bit rate R is greater than or equal to the threshold T1, the quantization parameter used in the second quantization method is set so to fit in the range ±TC with respect to the quantization parameter of the identical line of a neighboring tile held in the quantization parameter holding unit. That is, a limiter value Th described in Formula (1) is determined as TC.

As can be seen from FIG. 10B, when the quantization parameter of the i-th line in the sub-band of interest of the quantization target is defined to be Q(i), and the quantization parameter used when quantizing the i-th line of the sub-band corresponding to the same type of the neighboring tile (in the embodiment, the tile quantized and encoded immediately previously) to be Qpre(i), the quantization parameter Q(i) is allowed to vary in a range as in the following formula.

$$Qpre(i)-Th \leq Q(i) \leq Qpre(i)+Th$$

Here, Th is either TA, TB, or TC. The consequence of the above is that it is possible to suppress distortion of the boundary between the tile of interest and the neighboring tile.

Figure 11:
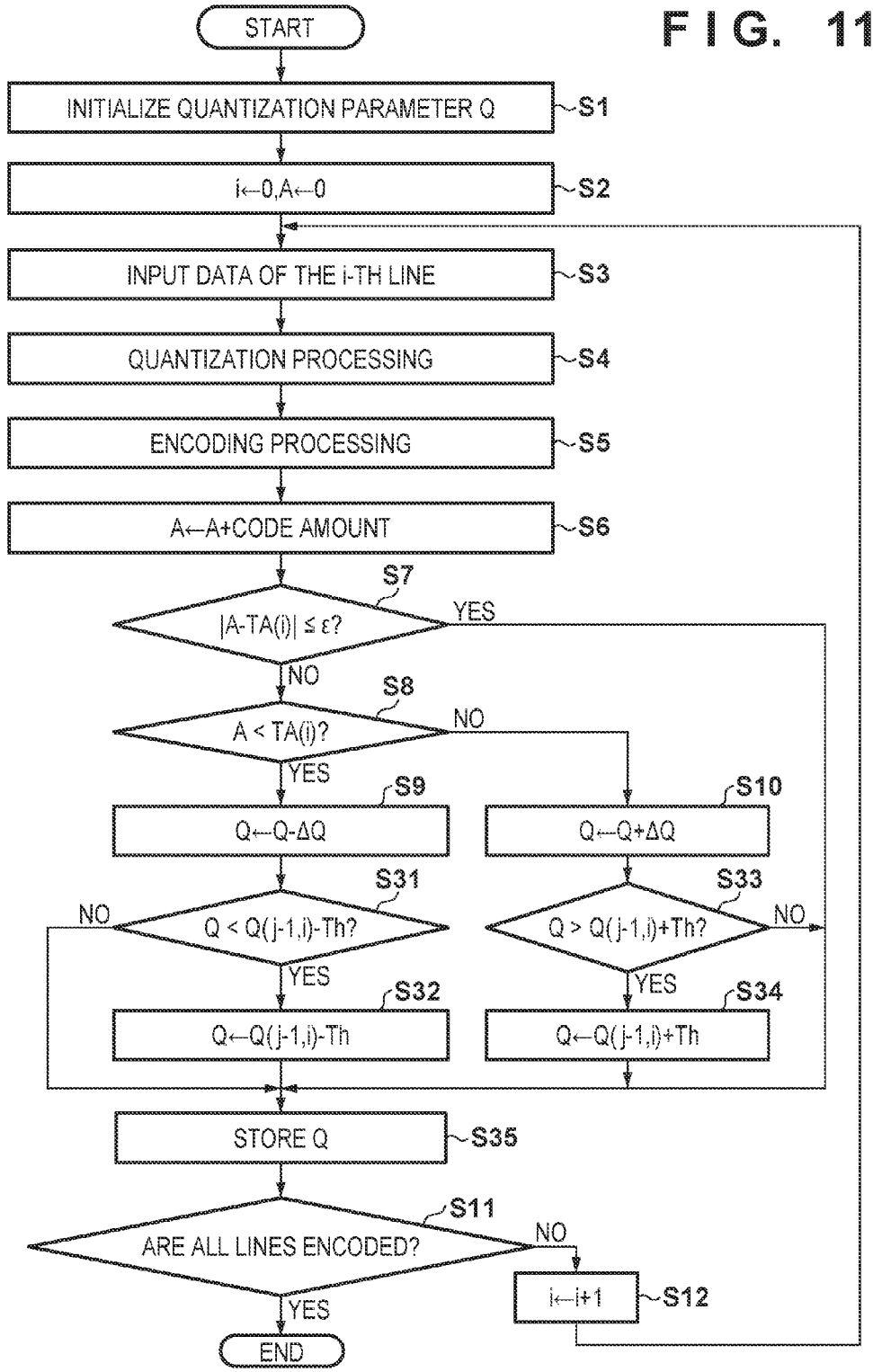
FIG. 11 is a flowchart illustrating an encoding processing procedure of the third embodiment.

Description is given in accordance with a flowchart of FIG. 11 of encoding processing of a particular sub-band under the control of the control unit 110 in the third embodiment next. Note that a variable i used in the following description is used to specify a line number. Also, a variable A is something that is used for storing the accumulated code amount from the 0th through the i-th line. Also, prior to encoding, the control unit 110, based on the bit rate R, references the table of FIG. 10A, selects one of {TA, TB, TC}, and sets that as the limiter value Th of the quantization parameter.

Step S1 through step S12 in the flowchart of FIG. 11 are the same as step S1 through step S12 of FIG. 7 of the first embodiment, but description will be given following the order once again.

Firstly, the control unit 110, in step S1, controls the quantization control unit 106 to set an initial value of a quantization parameter Q prior to encoding of a sub-band of interest. This initial value is determined by the bit rate R that the user sets, the number of divided tiles, the number of times of wavelet transformation, and the type of the sub-band of interest.

Next, in step S2, the control unit 110 clears each of the variable i and A to 0. Then, in step S3, the control unit 110 controls the quantizing unit 107 to cause input from the frequency converting unit 105 of the transformation coefficient data of the i-th line from the sub-band of interest, and in step S4 causes quantization to be performed using the quantization parameter Q. Then, in step S5, the control unit 110 controls the entropy encoding unit 108 to cause entropy encoding to be executed on the transformation coefficient data of the first line portion after quantization. Then, the control unit 110, in step S6, updates the variable A by adding the encoding data amount of the i-th line to the variable A.

Subsequently, the control unit 110 determines, in step S7, whether or not the absolute value of the difference between the accumulated code amount A up until the i-th line and an accumulated target code amount TA(i) is less than or equal to a threshold set in advance. If it is less than or equal to the threshold ε, the processing proceeds to step S11, the control unit 110 determines whether or not encoding of all lines has ended, and if not, the variable i is caused to increase by "1" in step S12, and the processing from step S3 is repeated.

Also, if the difference between the accumulated code amount A up until the i-th line and the accumulated target code amount TA(i) exceeds the threshold ε, the control unit 110 advances the processing to step S8, and determines whether or not A<TA(i), that is, whether or not the accumulated code amount A falls below the accumulated target code amount TA(i).

If A<TA(i), the code amount may be increased. Consequently, the control unit 110, in step S9, cause the quantization parameter Q to decrease by a positive predetermined value ΔQ set in advance. After this, in step S31, the control unit 110 performs the following processing.

Firstly, the control unit 110 reads the quantization parameter Q(j−1,i) used when quantizing the i-th line of the same sub-band of the neighboring tile from the quantization parameter holding unit 111. Then, the control unit 110 determines whether or not the following inequality is satisfied between the quantization parameter Q calculated in step S9, the read Q(j−1,i), and the limiter value Th (=one of Ta, Tb, and Tc).

$$Q<Q(j-1,i)-Th$$

If the above described inequality is satisfied, it means that the quantization parameter Q of the line of interest falls below the identical line of the sub-band of the same type of the neighboring tile by more than the allowable range. Consequently, the control unit 110, in step S32, sets the quantization parameter Q as Q(j−1,i)−Th. The result of this is that the quantization parameter Q never falls below a value resulting from subtracting the limiter value Th from the quantization parameter Q(j−1,i) of the same line in the sub-band of the same type of the neighboring tile. Next, the control unit 110, in step S35, in preparation for the next tile quantization and encoding, stores the quantization parameter Q in the quantization parameter holding unit 111 as Q(j−1,i).

Meanwhile, the control unit 110 advances the processing to step S33 when the quantization parameter Q is caused to increase by the positive predetermined value ΔQ set in advance in step S10. In step S33, the control unit 110 performs the following processing.

Firstly, the control unit 110 reads the quantization parameter Q(j−1,i) from the quantization parameter holding unit 111. Then, the control unit 110 determines whether or not the following inequality is satisfied between the quantization parameter Q calculated in step S10, the read Q(j−1,i), and the limiter value Th (=one of Ta, Tb, and Tc).

$$Q>Q(j-1,i)+Th$$

If the above described inequality is satisfied, it means that the quantization parameter Q of the line of interest exceeds the identical line of the sub-band of the same type of the neighboring tile by more than the allowable range. Consequently, the control unit 110, in step S34, sets the quantization parameter Q as Q(j−1,i)+Th. The result of this is that the quantization parameter Q never exceeds a value resulting from adding the limiter value Th to the quantization parameter Q(j−1,i) of the same line in the sub-band of the same type of the neighboring tile. Next, the control unit 110, in step S35, in preparation for the next tile quantization and encoding, stores the quantization parameter Q in the quantization parameter holding unit 111 as Q(j−1,i).

The control unit 110 advances the processing to step S11, and determines whether or not encoding of all lines of the sub-band of interest has ended, and if not, the variable i is caused to increase by "1" in step S12, and the processing from step S3 is repeated.

By configuring as described above, in encoding of an image divided into tiles, even if the quantization parameter of the leading line is an erroneous setting such as when a scene changes significantly, it becomes possible to change a quantization parameter in a sub-band significantly, and so it is possible to provide an image encoding apparatus with a higher bit rate convergence.

Note that there may be more types of allowable amounts of the quantization parameter of the third embodiment than the three types of TA, TB, and TC.

Also, in the third embodiment, the quantization parameter Q used when quantizing the i-th line of a particular sub-band in the tile of interest is set within the range of the quantization parameter Q(j−1,i) of the i-th line of the sub-band of the same type in the neighboring tile quantized and encoded immediately previously ±Th. Alternatively, configuration may be as follows.

The tile dividing unit 103 is made to be something that divides one frame's worth of image data into N x M tiles. Then, the tile of interest to be quantized and encoded is defined to be T(x,y). Here, there are the relationships 0≤x≤N−1, and 0 ≤y≤M−1. Quantization and encoding are performed in a raster scan order where tiles are made to be units, and therefore both the tile T(x,y−1) which is the above neighbor of the tile of interest T(x,y) and the tile T(x−1,y) which is the left neighbor are already encoded. Accordingly, the control unit 110 calculates the average value of the quantization parameters of the i-th line in the same sub-band in these tiles T(x,y−1) and T(x−1,y), and determines it to be the foregoing Q(j−1,i). Accordingly, the quantization parameter holding unit 111 may hold the quantization parameters for two tile's worth. Note that when the tile of interest T(x,y) is positioned at a top edge of an image, the tile T(x,y−1) does not exist. Note that when the tile of interest T(x,y) is positioned at a left edge of an image, the tile T(x−1,y) does not exist. In this way, if a neighboring tile that does not exist is referenced, that neighboring tile may be processed as something for which a quantization parameter that is set beforehand is held.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-232263, filed Nov. 27, 2015, and 2016-165071, filed Aug. 25, 2016, which are hereby incorporated by reference herein in their entirety.

What is claimed is:

1. An image encoding apparatus that divides image data to be encoded into a plurality of tiles, and encodes these tiles as units, the apparatus comprising:
   a tile dividing unit configured to divide image data to be encoded into a plurality of tiles;
   a frequency converting unit configured to generate a plurality of sub-bands by a frequency transform on the tiles divided by the tile dividing unit;
   a quantizing unit configured to quantize the sub-bands generated by the frequency converting unit by either:
   (1) a first quantization method of quantizing by identical quantization parameters in relation to identical sub-bands of a plurality of tiles, or
   (2) a second quantization method of quantizing by quantization parameters set individually for each tile in relation to identical sub-bands of a plurality of tiles;
   an encoding unit configured to encode data obtained by quantizing by the quantizing unit; and
   a control unit configured to switch, in accordance with a target data amount of the image data to be encoded, whether to quantize by the first quantization method or to quantize by the second quantization method,
   wherein the second quantization method causes a difference of quantization parameters between sub-bands of the same type in a tile of interest and a neighboring tile of the tile of interest to be within a predetermined range.

2. The apparatus according to claim 1, wherein the image data to be encoded is RAW image data of a Bayer array,
   the tile dividing unit generates four planes-an R plane, a B plane, a G1 plane, and a G2 plane-from one tile obtained by dividing the RAW image data, and
   the frequency converting unit generates a plurality of sub-bands by performing a wavelet transformation of each plane.

3. The apparatus according to claim 1, wherein the first quantization method is a method for, in accordance with one quantization parameter, quantizing coefficient data in one sub-band, and
   the second quantization method is a method for, in accordance with a quantization parameter updated in units of lines, quantizing coefficient data in one sub-band.

4. The apparatus according to claim 1, wherein the dividing unit performs a division of the same line of image data so that it is divided into a plurality of tiles, wherein in the second quantization method, a difference of quantization parameters between the same line of sub-bands of the same type in a tile of interest and a neighboring tile of the tile of interest is caused to be within a predetermined range.

5. The apparatus according to claim 1, wherein the control unit applies the first quantization method if the target data amount is smaller than a predetermined threshold, and the second quantization method if the target data amount is greater than or equal to the predetermined threshold.

6. The apparatus according to claim 1, wherein the control unit switches whether to quantize by the first quantization method or to quantize by the second quantization method in accordance with a bit rate set by a user.

7. The apparatus according to claim 1, wherein the control unit switches whether to quantize by the first quantization method or to quantize by the second quantization method in accordance with a target compression rate set by a user.

8. An image encoding apparatus that divides image data to be encoded into a plurality of tiles, and encodes these tiles as units, the apparatus comprising:

a tile dividing unit configured to divide image data to be encoded into a plurality of tiles,
a frequency converting unit configured to generate a plurality of sub-bands by a frequency transform on the tiles divided by the tile dividing unit
a quantizing unit configured to quantize the sub-bands generated by the frequency converting unit by either:
(1) a first quantization method of quantizing by identical quantization parameters in relation to identical sub-bands of a plurality of tiles, or
(2) a second quantization method of quantizing by quantization parameters set individually for each tile in relation to identical sub-bands of a plurality of tiles,
an encoding unit configured to encode data obtained by quantizing by the quantizing unit and
a control unit configured to switch, in accordance with a target data amount of the image data to be encoded, whether to quantize by the first quantization method or to quantize by the second quantization method,
wherein the control unit (a) applies the first quantization method to all sub-bands if the target data amount is smaller than a predetermined threshold, and (b) applies the first quantization method for a low frequency sub-band and the second quantization method for a high frequency sub-band if the target data amount is greater than or equal to the predetermined threshold.

9. A method of controlling an image encoding apparatus that divides image data to be encoded into a plurality of tiles, and encodes these tiles as units, the method comprising:
dividing image data to be encoded into a plurality of tiles;
generating a plurality of sub-bands by a frequency transform on the tiles divided by the tile dividing unit;
quantizing the generated sub-bands by either:
(1) a first quantization method of quantizing by identical quantization parameters in relation to identical sub-bands of a plurality of tiles, or
(2) a second quantization method of quantizing by quantization parameters set individually for each tile in relation to identical sub-bands of a plurality of tiles;
encoding data obtained by quantizing; and
switching, in accordance with a target data amount of the image data to be encoded, whether to quantize by the first quantization method or to quantize by the second quantization method,
wherein the second quantization method causes a difference of quantization parameters between sub-bands of the same type in a tile of interest and a neighboring tile of the tile of interest to be within a predetermined range.

10. A non-transitory computer-readable storage medium storing a program which causes a computer to execute steps in a method of controlling an image encoding apparatus that divides image data to be encoded into a plurality of tiles, and encodes these tiles as units, the method comprising:
dividing image data to be encoded into a plurality of tiles;
generating a plurality of sub-bands by a frequency transform on the tiles divided by the tile dividing unit;
quantizing the generated sub-bands by either:
(1) a first quantization method of quantizing by identical quantization parameters in relation to identical sub-bands of a plurality of tiles, or
(2) a second quantization method of quantizing by quantization parameters set individually for each tile in relation to identical sub-bands of a plurality of tiles;
encoding data obtained by quantizing; and
switching, in accordance with a target data amount of the image data to be encoded, whether to quantize by the first quantization method or to quantize by the second quantization method,
wherein the second quantization method causes a difference of quantization parameters between sub-bands of the same type in a tile of interest and a neighboring tile of the tile of interest to be within a predetermined range.

* * * * *